(12) United States Patent
Son

(10) Patent No.: US 7,771,860 B2
(45) Date of Patent: Aug. 10, 2010

(54) CATALYST OF A FUEL CELL, AND MEMBRANE-ELECTRODE ASSEMBLY AND FUEL CELL SYSTEM INCLUDING CATALYST

(75) Inventor: In-Hyuk Son, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 335 days.

(21) Appl. No.: 11/808,734

(22) Filed: Jun. 12, 2007

(65) Prior Publication Data

US 2008/0038615 A1 Feb. 14, 2008

(30) Foreign Application Priority Data

Jun. 14, 2006 (KR) .................... 10-2006-0053583

(51) Int. Cl.
| | |
|---|---|
| B01J 21/18 | (2006.01) |
| B01J 23/40 | (2006.01) |
| B01J 23/42 | (2006.01) |
| B01J 23/44 | (2006.01) |
| B01J 23/46 | (2006.01) |
| H01M 4/12 | (2006.01) |
| H01M 4/92 | (2006.01) |
| H01M 8/10 | (2006.01) |

(52) U.S. Cl. .............. 429/44; 429/13; 429/26; 429/30; 429/38; 429/42; 427/115; 502/101; 502/180; 502/182; 502/185

(58) Field of Classification Search ................. 429/42, 429/44, 30, 13, 26, 38; 427/115; 502/101, 502/180, 182, 185; H01M 4/92, 8/10, 4/12; B01J 21/18, B01J 23/40, 23/42, 23/44, 23/46

See application file for complete search history.

(56) References Cited

U.S. PATENT DOCUMENTS

| 6,485,855 | B1 * | 11/2002 | Fukuda et al. ............... 429/30 |
|---|---|---|---|
| 7,553,571 | B2 * | 6/2009 | Becerra et al. ............... 429/22 |
| 7,604,891 | B2 * | 10/2009 | Hong et al. .................. 429/38 |
| 2002/0037449 | A1 * | 3/2002 | Binder et al. ................ 429/42 |
| 2003/0121603 | A1 * | 7/2003 | Oh et al. ..................... 156/276 |
| 2003/0181321 | A1 * | 9/2003 | Hampden-Smith et al. .. 502/180 |
| 2005/0238948 | A1 * | 10/2005 | Mei et al. .................... 429/40 |
| 2006/0105232 | A1 * | 5/2006 | Tanuma ...................... 429/129 |
| 2006/0199054 | A9 * | 9/2006 | Gallagher et al. ............. 429/26 |

* cited by examiner

*Primary Examiner*—Melvin C Mayes
*Assistant Examiner*—Jun Li
(74) *Attorney, Agent, or Firm*—Robert E. Bushnell, Esq.

(57) ABSTRACT

A fuel cell catalyst includes a carbon-containing core, and an active metal shell attached to the carbon core by an ionomer. The catalyst has a high catalyst utility, and facilitates a highly efficient and high power fuel cell. The ionomer is disposed between the active metal and the carbon core. The carbon core and the active metal are present in a mixing ratio ranging from 0.0001:99.9999 wt % to 0.05:99.95 wt %.

42 Claims, 6 Drawing Sheets

CATALYST OF A FUEL CELL, AND MEMBRANE-ELECTRODE ASSEMBLY AND FUEL CELL SYSTEM INCLUDING CATALYST

CLAIM OF PRIORITY

This application makes reference to, incorporates the same herein, and claims all benefits accruing under 35 U.S.C. §119 from an application for CATALYST FOR FUEL CELL, AND MEMBRANE-ELECTRODE ASSEMBLY AND FUEL CELL SYSTEM COMPRISING SAME earlier filed in the Korean Intellectual Property Office on the 14$^{th}$ of Jun. 2006 and there duly assigned Serial No. 10-2006-0053583.

BACKGROUND OF THE INVENTION

1. Field of the Invention

The present invention relates to a catalyst of a fuel cell, and a membrane-electrode assembly and a fuel cell system including the catalyst. More particularly, the present invention relates to a catalyst that has a high catalyst utility, and facilitates a highly efficient and high power fuel cell, and a membrane-electrode assembly and a fuel cell system including the catalyst.

2. Description of the Related Art

A fuel cell is a power generation system for producing electrical energy through an electrochemical redox reaction of an oxidant and hydrogen in a hydrocarbon-based material, such as methanol, ethanol, or natural gas. Such a fuel cell is a clean energy source that may replace fossil fuels. It includes a stack composed of unit cells, and produces various ranges of power. Since it has four to ten times higher energy density than a small lithium battery, it has been highlighted as a small portable power source.

Representative exemplary fuel cells include a Polymer Electrolyte Membrane Fuel Cell (PEMFC) and a Direct Oxidation Fuel Cell (DOFC). The DOFC includes a direct methanol fuel cell that uses methanol as a fuel.

The polymer electrolyte fuel cell has an advantage of high energy density, but it also has problems in the need to carefully handle hydrogen gas and the requirement of accessory facilities such as a fuel reforming processor for reforming methane or methanol, natural gas, and the like in order to produce hydrogen as the fuel gas.

On the contrary, a DOFC has a lower energy density than that of the polymer electrolyte fuel cell, but it has the advantages of easy handling of a fuel, being capable of operating at room temperature due to its low operation temperature, and no need for additional fuel reforming processors.

SUMMARY OF THE INVENTION

One embodiment of the present invention provides a fuel cell catalyst having an excellent catalyst utility.

Another embodiment of the present invention provides a membrane-electrode assembly of a fuel cell that has improved performance due to the fuel cell catalyst having an excellent catalyst utility and smooth fuel supply.

Yet another embodiment of the present invention provides a highly efficient and high power fuel cell system including the membrane-electrode assembly.

According to one embodiment of the present invention, a fuel cell catalyst is provided including a carbon-containing core, and an active metal attached to the carbon core by an ionomer.

According to another embodiment of the present invention, a membrane-electrode assembly of a fuel cell is provided including a cathode and an anode facing each other, and a polymer electrolyte membrane interposed therebetween. At least one of the anode and the cathode includes an electrode substrate and a catalyst layer including the above catalyst.

According to yet another embodiment of the present invention, a fuel cell system is provided including at least one electricity generating element, a fuel supplier, and an oxidant supplier. The electricity generating element includes the above membrane-electrode assembly and separators arranged at each side thereof.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The present invention relates to a fuel cell catalyst that includes a carbon-containing core, and an active metal attached to the core by an ionomer.

Figure 1A:
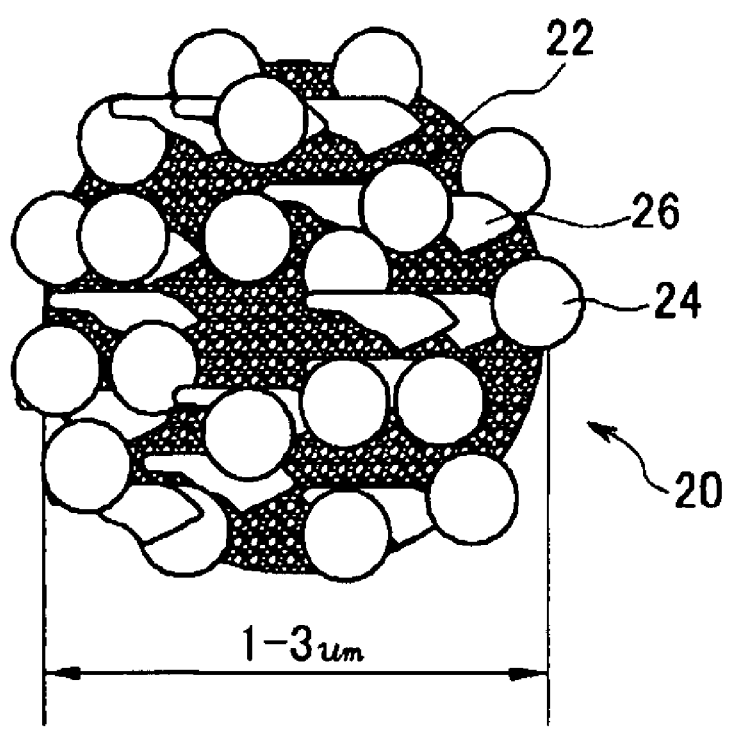
FIG. 1A is a view of a fuel cell catalyst according to an embodiment of the present invention.
Figure 1B:
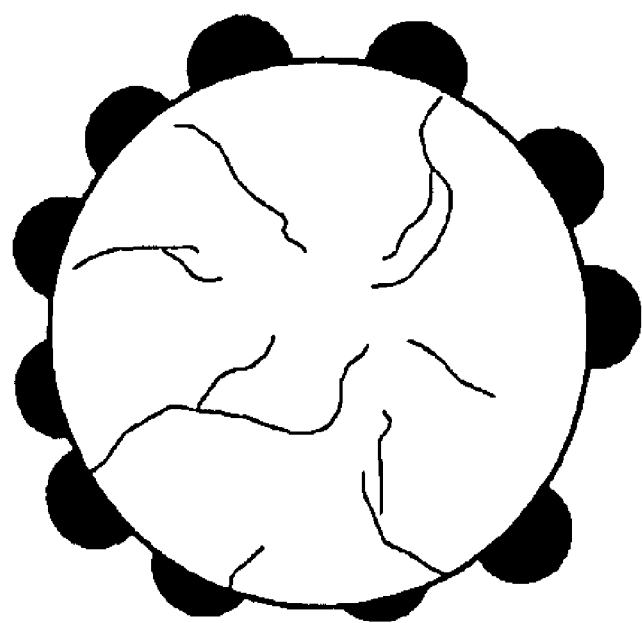
FIG. 1B is a cross-section of a fuel cell catalyst according to an embodiment of the present invention.

As shown in FIG. 1A, the catalyst 20 includes the core 22 and the active metal 26 attached to the core 22 by the ionomer 24. FIG. 1B is a cross-section of the catalyst 20 illustrating that the active metal is not present inside the core of the catalyst. The active metal is present at the surface of the core while being attached by the ionomer, and an area of the catalyst that contacts the fuel is thereby increased, resulting in an improvement of the catalyst utility. On the contrary, if the ionomer is present outside of the active metal so as to increase the attachment between the active metal and core, an area of the catalyst that contacts the fuel is decreased, thereby resulting in deterioration of the catalyst utility.

Examples of the carbon include a conductive powder such as a carbon powder, Vulcan, carbon black, acetylene black, activated carbon, carbon fiber, fullerene, carbon nanotubes, carbon nanowire, carbon nanohorns, or carbon nanorings.

The core has an average particle diameter of 1 μm or more. According to one embodiment, the core has an average particle diameter of 1 to 100 μm. According to another embodiment, the core has an average particle diameter of 1 to 50 μm. When the average particle diameter of the core is less than 1 μm, then mass transfer of a fuel and an oxidant is not fluent enough to obtain high power, that is to say, power at a low voltage is decreased. When the average particle diameter of the core is less than or equal to 100 μm, excellent electrical conductivity and power may be obtained.

The core has porosity ranging from 30 to 50%. When the porosity of the core is more than 50%, power is decreased due to a small amount of a catalyst, and electrical resistance is increased because an electrode layer is thicker. When the porosity of the core is less than 30%, high current power is decreased according to a decrease of mass transfer.

Since the core is porous, a fuel and an oxidant are supplied easily, and CO2 generated in an anode of a cell that uses a hydrocarbon fuel may be easily discharged. The core plays a role of a fuel supplier since a fuel may be stored therein.

The active metal has catalyst activity and includes at least one metal selected from the group consisting of platinum, ruthenium, osmium, a platinum-ruthenium alloy, a platinum-osmium alloy, a platinum-palladium alloy, and a platinum-M alloy, where M is a transition element selected from the group consisting of Ga, Ti, V, Cr, Mn, Fe, Co, Ni, Cu, Zn, Sn, Mo, W, Rh, Ru, and combinations thereof. The active metal may be supported on a supporter. Specific examples of the active metal include at least one metal selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W.

The supporter may be a carbon-based material such as graphite, denka black, ketjen black, acetylene black, carbon nanotubes, carbon nanofiber, carbon nanowire, carbon nanoballs, activated carbon, and so on, or an inorganic material particulate such as alumina, silica, zirconia, titania, and so on. The carbon-based material is generally used.

The active metal includes secondary particles of an average particle diameter ranging from 50 to 200 nm that is composed of assembled primary particles having an average particle diameter ranging from 2 to 15 nm. According to one embodiment, the active material includes secondary particles of an average particle diameter ranging from 60 to 100 nm. When the active metal secondary particles have an average particle diameter of less than 50 nm, the active metal is encapsulated by an ionomer, whereas when it is more than 200 nm, its specific surface area is reduced.

Non-limiting examples of the ionomer that attaches the active metal to the carbon core include at least one selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyetheretherketone-based polymers, and polyphenylquinoxaline-based polymers. In one embodiment, the ionomer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The core and active metal are present at a mixing ratio ranging from 0.0001 to 0.05: 99.9999 to 99.95 wt %. According to one embodiment, the core and active metal are present at a mixing ratio ranging from 0.01 to 0.25:99.99 to 99.75 wt %. The ionomer is present in an amount of 10 to 20 parts by weight based on 100 parts by weight of the sum of the core and active metal. When the ionomer is present in an amount of less than 10 parts by weight, power is decreased due to a deterioration of proton conductivity, whereas when it is more than 20 parts by weight, power is decreased because the catalyst layer becomes thicker and the catalyst is encapsulated by the ionomer.

The catalyst of a fuel cell of the present invention has a high catalyst utility because it is positioned on the carbon surface, and does not agglomerate and has a high mechanical stability because the carbon supporter is encapsulated by the catalyst. The catalyst of a fuel cell according to one embodiment of the present invention has a higher catalyst utility than a conventional supported catalyst. Fuels and gases may be easily exchanged due to pores formed on the carbon core. Furthermore, a fuel that is stored in the carbon may be supplied directly as a fuel to implement a smooth fuel supply resulting in the prevention of activity deterioration. On the contrary, a conventional supported catalyst has a problem of smooth fuel supply. The catalyst according to one embodiment of the present invention is economical because the amount of catalyst may be decreased due to the high catalyst utility.

The catalyst according to the present invention is fabricated by attaching an active material using the ionomer to a carbon core including secondary particles that are composed of assembled primary particles.

The catalyst may be used in an anode and a cathode of a fuel cell, and is particularly appropriate for a direct oxidation fuel cell that uses a hydrocarbon fuel.

Figure 2:
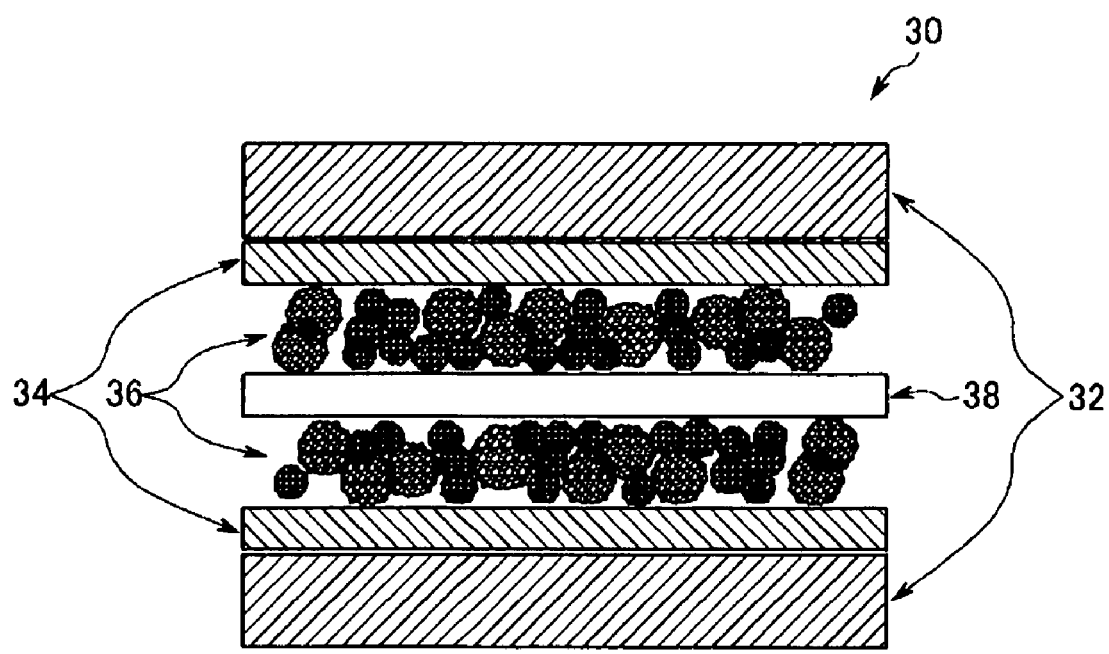
FIG. 2 is a schematic cross-sectional view of a membrane-electrode assembly according to an embodiment of the present invention.

The membrane-electrode assembly includes an anode and a cathode facing each other, and an electrolyte interposed therebetween. The anode and the cathode include a conductive electrode substrate and a catalyst layer disposed thereon. As shown in FIG. 2, the membrane-electrode assembly 30 includes the electrode substrate 32, the gas diffusion layer 34, the catalyst layer 36 including the above catalyst 20, and the polymer electrolyte membrane 38 disposed on the catalyst layer 36.

As for the electrode substrates, a conductive substrate is used, for example, carbon paper, carbon cloth, carbon felt, or a metal cloth (a porous film including a metal cloth fiber or a metalized polymer fiber). However, the present invention is not limited thereto. The electrode substrates support the electrodes, and provide paths for transferring the fuel and the oxidant to the catalyst layers.

The electrode substrates may be treated with a fluoro-based resin to be water-repellent to prevent deterioration of the diffusion efficiency due to water generated during the operation of a fuel cell. The fluoro-based resin may include polytetrafluoroethylene, polyvinylidene fluoride, polyhexafluoropropylene, polyperfluoroan alkylvinylether, polyperfluorosulfonyl-fluoridealkoxyvinyl ether, fluorinated ethylene propylene, polychlorotrifluoroethylene, or copolymers thereof.

A microporous layer may be added between the above electrode substrates and the catalyst layers to increase reactant diffusion effects. The microporous layer generally includes conductive powders with a particular particle diameter. The conductive material may include, but is not limited to, a carbon powder, carbon black, acetylene black, activated carbon, carbon fiber, fullerene, carbon nanotubes, carbon nanowire, carbon nanohorns, carbon nanorings, or combinations thereof.

The microporous layer is formed by coating a composition including a conductive powder, a binder resin, and a solvent on the gas diffusion layer. The binder resin may include, but is not limited to, polytetrafluoroethylene, polyvinylidene-fluoride, polyhexafluoropropylene, polyperfluoroan alkylvinylether, polyperfluorosulfonylfluoride, alkoxyvinylether, polyvinylalcohol, celluloseacetate, or copolymers thereof. The solvent may include, but is not limited to, an alcohol such as ethanol, isopropyl alcohol, n-propyl alcohol, butanol, and so on, water, dimethylacetamide, dimethylsulfoxide, N-methylpyrrolidone, tetrahydrofuran, and so on. The coating method may include, but is not limited to, screen printing, spray coating, doctor blade methods, gravure coating, dip coating, silk screening, painting, and so on, depending on the viscosity of the composition.

The polymer electrolyte membrane may include any proton conductive polymer resin that is generally used for a polymer electrolyte membrane. The proton conductive polymer resin is a polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one selected from the group consisting of fluoro-based polymers, benzimidazole-based polymers, polyimide-based polymers, polyetherimide-based polymers, polyphenylene-sulfide-based polymers, polysulfone-based polymers, polyethersulfone-based polymers, polyetherketone-based polymers, polyether-etherketone-based polymers, and polyphenylquinoxaline-based polymers. In one embodiment, the polymer resin is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The H may be substituted with Na, K, Li, Cs, or tetrabutylammonium in a proton conductive group of the proton conductive polymer. When the H is substituted with Na in an ion exchange group at the terminal end of the proton conductive group, NaOH is used. When the H is substituted with tetrabutylammonium, tributylammonium hydroxide is used. K, Li, or Cs may also be substituted by using appropriate compounds. A method of substituting H is known in this related art, and is therefore not further described in detail.

According to yet another embodiment of the present invention, a fuel cell system including the above membrane-electrode assembly is provided. The fuel cell system of the present invention includes at least one electricity generating element, a fuel supplier, and an oxidant supplier.

The electricity generating element includes a membrane-electrode assembly, and separators (referred to as bipolar plates) positioned at both sides of the membrane-electrode assembly. It generates electricity through oxidation of a fuel and reduction of an oxidant.

The fuel supplier plays a role of supplying the electricity generating element with a fuel. The fuel includes liquid or gaseous hydrogen, or a hydrocarbon-based fuel, such as methanol, ethanol, propanol, butanol, or natural gas.

Figure 3:
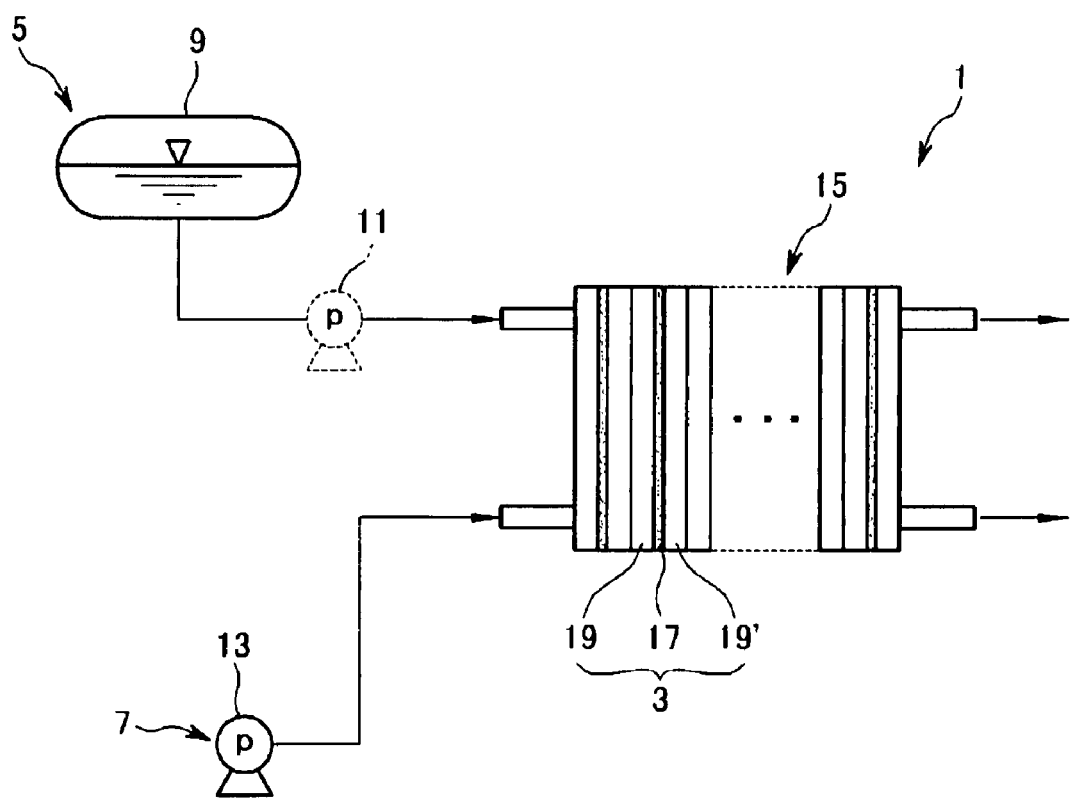
FIG. 3 is view of a fuel cell system according to an embodiment of the present invention.

FIG. 3 is a view of a schematic structure of a fuel cell system 1 described in detail as follows with reference to this accompanying drawing. FIG. 3 illustrates a fuel cell system wherein a fuel and an oxidant are provided to the electricity generating element 3 through pumps 11 and 13, but the present invention is not limited to such a structure. The fuel cell system of the present invention may alternatively include a structure wherein a fuel and an oxidant are provided in a diffusion manner.

The fuel cell system 1 includes at least one electricity generating element 3 that generates electrical energy through an electrochemical reaction of a fuel and an oxidant, a fuel supplier 5 for supplying a fuel to the electricity generating element 3, and an oxidant supplier 7 for supplying an oxidant to the electricity generating element 3.

In addition, the fuel supplier 5 is equipped with a tank 9 that stores the fuel, and the pump II that is connected therewith.

The fuel pump 11 supplies fuel stored in the tank 9 with a predetermined pumping power.

The oxidant supplier 7, which supplies the electricity generating element 3 with an oxidant, is equipped with at least one pump 13 for supplying an oxidant with a predetermined pumping power.

The electricity generating element 3 includes a membrane-electrode assembly 17 that oxidizes hydrogen or a fuel and reduces an oxidant, and separators 19 and 19' that are respectively positioned at opposite sides of the membrane-electrode assembly and supply the hydrogen or a fuel, and the oxidant. At least one electricity generating element 17 is composed in a stack 15.

The following examples illustrate the present invention in more detail. However, it is understood that the present invention is not limited by these examples.

EXAMPLE 1

Pt—Ru black (Johnson Matthey) having an average particle diameter of 50 nm and a Pt black active material (Johnson Matthey) were uniformly attached to carbon particles having an average particle diameter of 1 μm (porosity 95%: VULCAN) (E-tec Co.) using polyperfluorosulfonic acid to prepare an anode catalyst and a cathode catalyst for a fuel cell, respectively. The carbon and the active material were present at a mixing ratio of 50:50 volume %, that is 0.02 wt %:99.98 wt %, and polyperfluorosulfonic acid was used in an amount of 18 parts by weight based on 100 parts by weight of the carbon and active material.

82 wt % of the prepared anode catalyst and cathode catalyst and 18 wt % of 5 wt % NAFION/$H_2O$/2-propanol (Solution Technology Inc.) as a binder were respectively mixed to prepare an anode catalyst composition and a cathode catalyst composition.

The anode catalyst composition was coated on a carbon paper electrode substrate including 0.2 mg/cm$^2$ of carbon to prepare an anode, and the cathode catalyst composition was coated on a carbon paper electrode substrate including 1.3 mg/cm$^2$ of carbon to prepare a cathode. Herein, catalyst loading amounts of the anode and cathode were respectively 4 mg/cm$^2$.

The prepared anode and cathode and a commercial available NAFION115 (perfluorosulfonate) polymer electrolyte membrane were used to fabricate a unit cell.

COMPARATIVE EXAMPLE 1

A unit cell was fabricated according to the same method as in Example 1, except that the 1 μm average particle diameter carbon was not used.

Figure 4A:
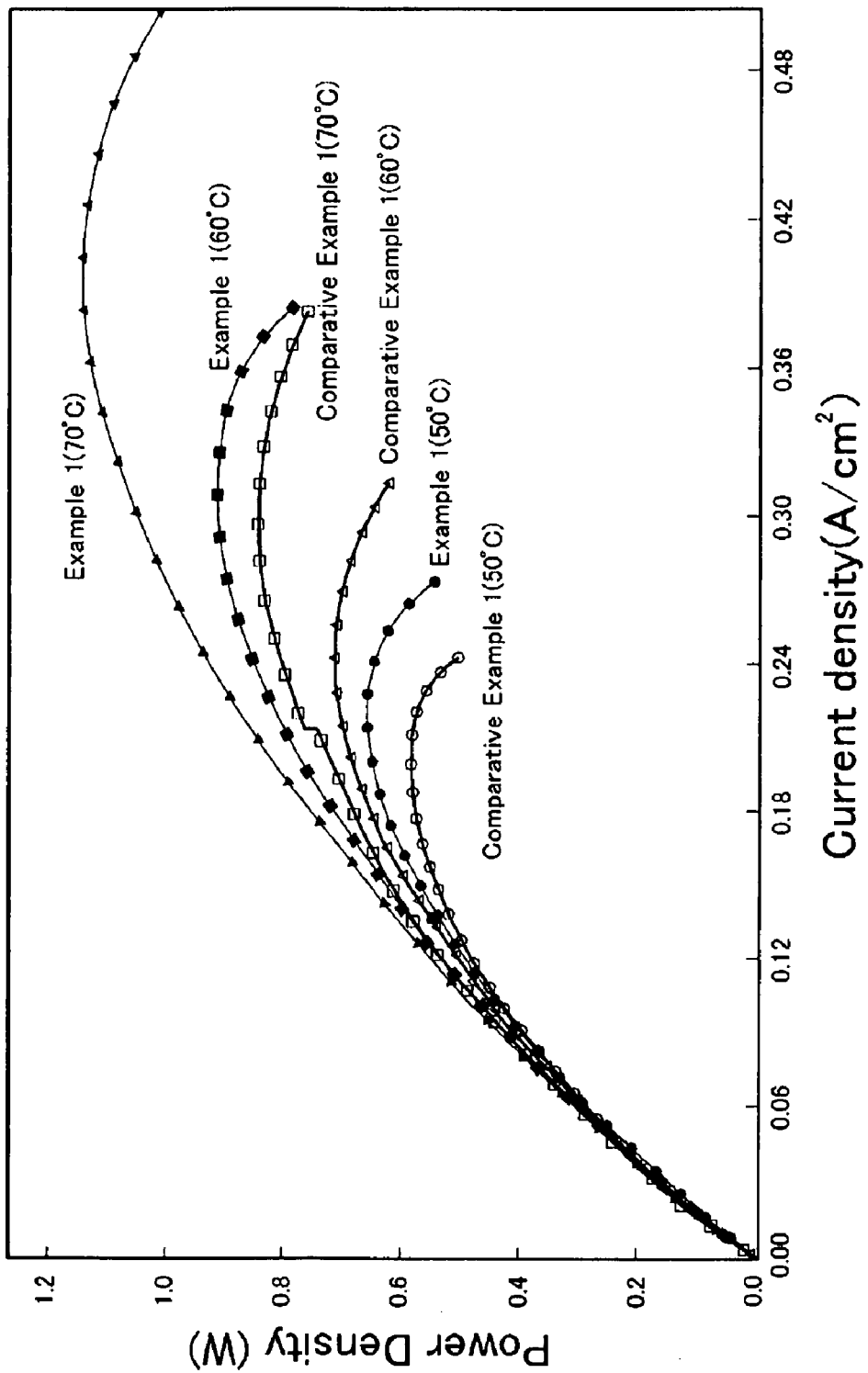
FIG. 4A is a graph of power characteristics of a fuel cell according to Example 1 and Comparative Example 1.
Figure 4B:
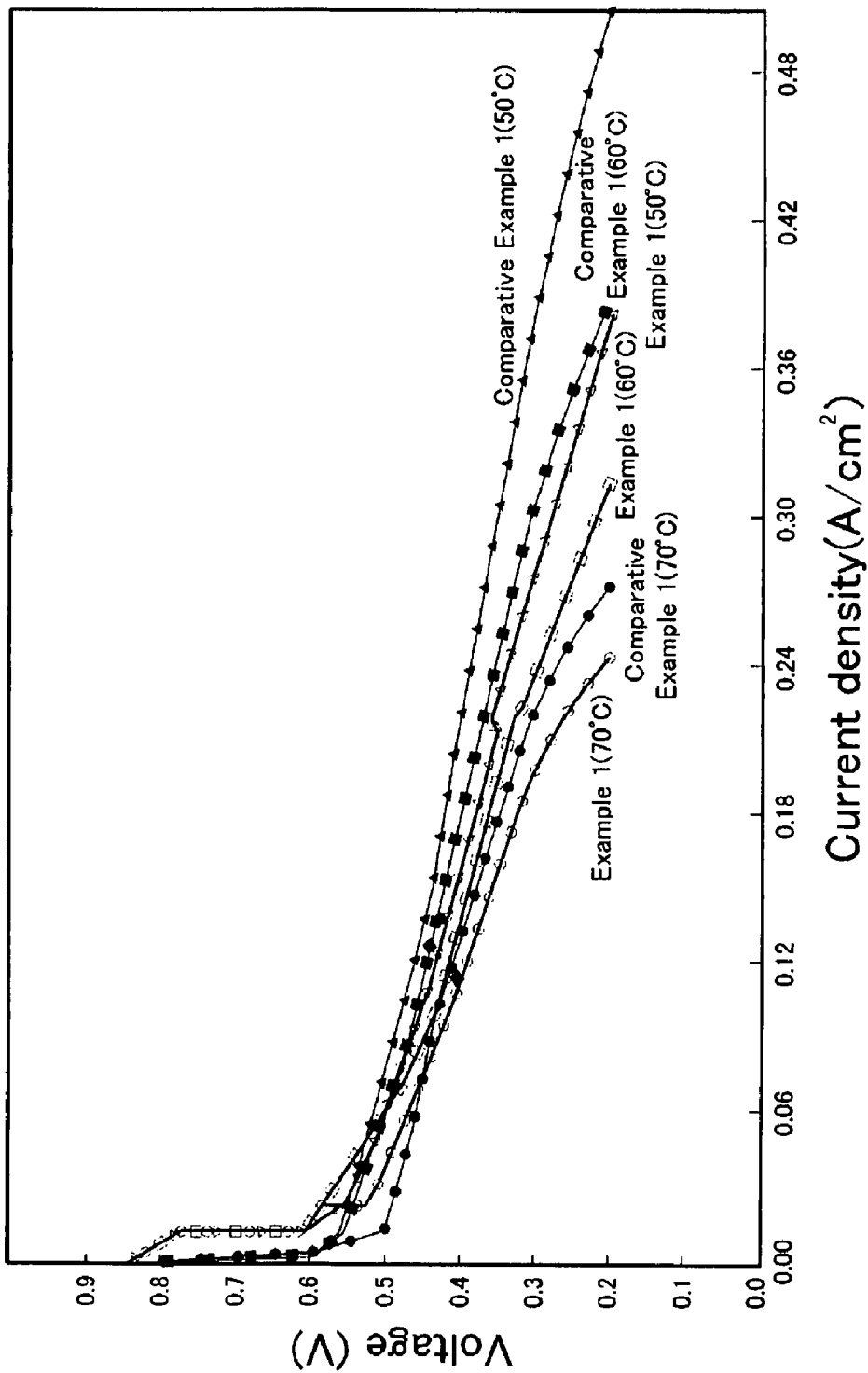
FIG. 4B is a graph of current density and voltage characteristics of the fuel cell according to Example 1 and Comparative Example 1.

The unit cells fabricated according to Example 1 and Comparative Example 1 were operated while supplying 1 M methanol. Power densities and voltage of the fuel cells at 0.45V and 0.4V were measured at 50, 60, and 70 respectively, and the results are shown in the following Table 1 and FIGS. 4A and 4B. Herein, the maximum values (Max in Table 1) at 0.4V are also shown in the following Table 1.

TABLE 1

|  | Comparative Example 1 | | | Example 1 | | |
| --- | --- | --- | --- | --- | --- | --- |
|  | 0.45 V | 0.4 V | Max | 0.45 V | 0.4 V | Max |
| 50° C. | 32 | 45 | 58 | 43 | 53 | 66 |
| 60° C. | 39 | 53 | 71 | 46 | 69 | 90 |
| 70° C. | 46 | 64 | 84 | 59 | 85 | 113 |

As shown in Table 1 and FIG. 4, power densities of the fuel cell using the catalyst of Example 1 are excellent compared to those of Comparative Example 1. In particular, the fuel cell using the catalyst of Example 1 has excellent power at a high temperature.

As described above, the catalyst has a high catalyst utility, and provides a highly efficient and high power fuel cell.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A catalyst of a fuel cell, comprising:
   a carbon-containing core; and
   an active metal attached to the carbon core by an ionomer, the ionomer being disposed between the active metal and the carbon core, the core and active metal being present at a mixing ratio ranging from 0.0001:99.9999 wt % to 0.05:99.95 wt %.

2. The catalyst of claim 1, wherein the core has an average particle diameter of 1 μm or more.

3. The catalyst of claim 2, wherein the core has an average particle diameter of 1 to 100 μm.

4. The catalyst of claim 3, wherein the core has an average particle diameter of 1 to 50 μm.

5. The catalyst of claim 1, wherein the core has a porosity ranging from 30 to 50%.

6. The catalyst of claim 1, wherein the active metal comprises secondary particles of an average particle diameter ranging from 50 to 200 nm and composed of assembled primary particles having an average particle diameter ranging from 2 to 15 nm.

7. The catalyst of claim 6, wherein the secondary particles have an average particle diameter ranging from 60 to 100 nm.

8. The catalyst of claim 1, wherein the active metal is at least one metal selected from the group consisting of platinum, ruthenium, osmium, a platinum-ruthenium alloy, a platinum-osmium alloy, a platinum-palladium alloy, a platinum-M alloy, and combinations thereof, wherein M is a transition element selected from the group consisting of Ga, Ti, V, Cr, Mn, Fe, Co, Ni, Cu, Zn, Sn, Mo, W, Rh, Ru, and combinations thereof; and at least one metal supported on a supporter.

9. The catalyst of claim 8, wherein the supporter is either a carbon-based material or an inorganic material.

10. The catalyst of claim 1, wherein the ionomer is at least one selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof.

11. The catalyst of claim 10, wherein, the ionomer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), poly(2,5-benzimidazole), and combinations thereof.

12. The catalyst of claim 1, wherein the core and active metal are present at a mixing ratio ranging from 0.01:99.99 wt % to 0.25:99.75 wt %.

13. The catalyst of claim 1, wherein the ionomer is present in an amount of 10 to 20 parts by weight based on 100 parts by weight of the core and active metal together.

14. The catalyst of claim 1, wherein the fuel cell of the catalyst comprises a direct oxidation fuel cell.

15. A membrane-electrode assembly of a fuel cell, the assembly comprising:
    a cathode and an anode facing each other; and
    a polymer electrolyte membrane interposed between the cathode and the anode;
    wherein at least one of the anode and cathode includes:
        an electrode substrate and a catalyst layer arranged on the electrode substrate, the catalyst layer including a carbon-containing core; and
        an active metal attached to the carbon core by an ionomer, the ionomer being disposed between the active metal and the carbon core, the core and active metal being present at a mixing ratio ranging from 0.0001:99.9999 wt % to 0.05:99.95 wt %.

16. The membrane-electrode assembly of claim 15, wherein the core has an average particle diameter of 1 μm or more.

17. The membrane-electrode assembly of claim 16, wherein the core has an average particle diameter of 1 to 100 μm.

18. The membrane-electrode assembly of claim 17, wherein the core has an average particle diameter of 1 to 50 μm.

19. The membrane-electrode assembly of claim 15, wherein the core has a porosity ranging from 30 to 50%.

20. The membrane-electrode assembly of claim 15, wherein the active metal comprises secondary particles of an average particle diameter ranging from 50 to 200 nm and composed of assembled primary particles having an average particle diameter ranging from 2 to 15 nm.

21. The membrane-electrode assembly of claim 20, wherein the secondary particles have an average particle diameter ranging from 60 to 100 nm.

22. The membrane-electrode assembly of claim 15, wherein the active metal is at least one metal selected from the group consisting of platinum, ruthenium, osmium, a platinum-ruthenium alloy, a platinum-osmium alloy, a platinum-palladium alloy, a platinum-M alloy, and combinations thereof, wherein M is a transition element selected from the group consisting of Ga, Ti, V, Cr, Mn, Fe, Co, Ni, Cu, Zn, Sn, Mo, W, Rh, Ru, and combinations thereof; and at least one metal supported on a supporter.

23. The membrane-electrode assembly of claim 22, wherein the supporter is either a carbon-based material or an inorganic material.

24. The membrane-electrode assembly of claim 15, wherein the ionomer is at least one selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof.

25. The membrane-electrode assembly of claim 24, wherein the ionomer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), poly(2,5-benzimidazole), and combinations thereof.

26. The membrane-electrode assembly of claim 15, wherein the core and active metal are present at a mixing ratio ranging from 0.01: 99.99 wt % to 25:99.75 wt %.

27. The membrane-electrode assembly of claim 15, wherein the ionomer is present in an amount of 10 to 20 parts by weight based on 100 parts by weight of the core and active metal together.

28. The membrane-electrode assembly of claim 15, wherein the fuel cell of the catalyst comprises a direct oxidation fuel cell.

29. A fuel cell system comprising:
at least one electricity generating element including:
a membrane-electrode assembly including a cathode, an anode, and a polymer electrolyte membrane interposed between the cathode and the anode, and
separators arranged at each side of the membrane-electrode assembly;
a fuel supplier; and
an oxidant supplier:
wherein at least one of the anode and cathode includes an electrode substrate and a catalyst layer arranged on the electrode substrate, and the catalyst layer includes a carbon-containing core, and
an active metal attached to the carbon core by an ionomer, with the ionomer being disposed between the active metal and the carbon core, the core and active metal being present at a mixing ratio ranging from 0.0001: 99.9999 wt % to 0.05:99.95 wt %.

30. The fuel cell system of claim 29, wherein the core has an average particle diameter of 1 µm or more.

31. The fuel cell system of claim 30, wherein the core has an average particle diameter of 1 to 100 µm.

32. The fuel cell system of claim 31, wherein the core has an average particle diameter of 1 to 50 µm.

33. The fuel cell system of claim 29, wherein the core has a porosity ranging from 30 to 50%.

34. The fuel cell system of claim 29, wherein the active metal comprises secondary particles of an average particle diameter ranging from 50 to 200 nm and composed of assembled primary particles having an average particle diameter ranging from 2 to 15 nm.

35. The fuel cell system of claim 34, wherein the secondary particles have an average particle diameter ranging from 60 to 100 nm.

36. The fuel cell system of claim 29, wherein the active metal is at least one metal selected from the group consisting of platinum, ruthenium, osmium, a platinum-ruthenium alloy, a platinum-osmium alloy, a platinum-palladium alloy, a platinum-M alloy, and combinations thereof, wherein M is a transition element selected from the group consisting of Ga, Ti, V, Cr, Mn, Fe, Co, Ni, Cu, Zn, Sn, Mo, W, Rh, Ru, and combinations thereof; and at least one metal supported on a supporter.

37. The fuel cell system of claim 36, wherein the supporter is either a carbon-based material or an inorganic material.

38. The fuel cell system of claim 29, wherein the ionomer is at least one selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof.

39. The fuel cell system of claim 38, wherein the ionomer is at least one selected from the group consisting of poly (perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), poly(2,5-benzimidazole), and combinations thereof.

40. The fuel cell system of claim 29, wherein the core and active metal are present at a mixing ratio ranging from 0.01: 99.99 wt % to 0.25:99.75 wt %.

41. The fuel cell system of claim 29, wherein the ionomer is present in an amount of 10 to 20 parts by weight based on 100 parts by weight of the core and active metal together.

42. The fuel cell system of claim 29, wherein the fuel cell of the catalyst comprises a direct oxidation fuel cell.

* * * * *